United States Patent Office 3,397,997

Patented Aug. 20, 1968

3,397,997

OLEAGINOUS GEL COMPOSITION

Cornelis H. Japikse, Springfield Township, Hamilton County, Ohio, assignor to The Procter & Gamble Company, Cincinnati, Ohio, a corporation of Ohio No Drawing. Continuation-in-part of application Ser. No. 408,348, Nov. 2, 1964. This application Apr. 25, 1966, Ser. No. 544,695

13 Claims. (Cl. 99—118)

ABSTRACT OF THE DISCLOSURE

An oleaginous gel composition having a stable beta crystalline phase with a solids particle size up to about 10 microns prepared by rapidly crystallizing triglyceride solids in-process to beta-phase by rapidly chilling to less than about 85° F. in less than about 60 seconds a completely melted mixture of from about 92% to about 99%, by weight, of liquid glyceride oil having an iodine value of about 107 or greater and from about 1% to 8%, by weight, of solid triglyceride having an iodine value not exceeding about 12, said solid triglyceride consisting essentially of a blend of (a) beta-phase-tending hardstock and (b) non-beta-phase-tending hardstock, the proportion of (a) and (b) in said solid triglyceride blend ranging from about 1:4 to about 4:1.

This application is a continuation in part of application Ser. No. 408,348, filed Nov. 2, 1964, now abandoned.

This invention relates to oleaginous compositions having a gel structure and, more particularly, to gel compositions of solid triglyceride fats in liquid fatty acid esters having a stable beta crystalline phase.

A large variety of oleaginous compositions are available on the market today which are useful for various cooking and shortening purposes. Most of these oleaginous compositions are essentially glycerides of one sort or another; they are generally derived from animal, vegetable and marine fats and oils. Some of these glycerides, for example the animal fats such as butterfat, lard and tallow, generally are solid or plastic in consistency. Other glycerides, for example the naturally-occurring liquid vegetable oils such as olive, corn, soybean and cottonseed oils, are normally liquid in consistency.

Although some of the naturally-occurring liquid glycerides (after suitable refining, bleaching, and deodorizing) are used directly for cooking and other shortening purposes, it is also common practice to convert these liquid glycerides to plastic shortenings having a rigid, non-fluid matrix by incorporating or foaming therein relatively small amounts, such as 10 to 15 percent, of normally solid glycerides.

The solid or plastic shortenings are dispersions of solid glyceride material in liquid glyceride material. The naturally-occurring liquid glycerides also contain some solid glyceride material dispersed in the liquid glyceride material, but the solids present are usually too small in quantity or of too low a melting point at normal room temperature to form a rigid matrix under oridinary conditions. The solid glyceride fraction of naturally-occurring liquid glycerides can, of course, be removed to a large extent by various methods, such as by fractional crystallization, or be inhibited from crystallization by the use of certain additives known as crystallization inhibitors.

The over-all consistency of shortenings having dispersions of solid glyceride material in liquid glyceride material is determined by the amount of solid glyceride phase present, the size and total surface area of the solid particles, and the nature of the binding forces between the solid particles. The consistency can vary from that of a liquid with one large solid "chunk" or "lump" in it, to a fine dispersion in the liquid of many small particles of colloidal size. Between these two extremes a wide range of consistencies is possible. The present invention is concerned with certain of these dispersions which contain solid triglyceride material in liquid glyceride material, and are defined as "oleaginous gels" having a stable vetacrystalline phase as described hereinafter.

It is generally accepted that the rheological properties of the above-described oleaginous systems of solid glyceride material in liquid glyceride material are determined by the presence of a three-dimensional network formed by flocculation or aggregation of the dispersed particles. These networks are capable of entrapping liquid glycerides to give the composition the appearance of a solid, while containing as much as about 95% liquid oil.

Two types of interparticle binding forces are responsible for the formation of these three-dimensional networks: the primary or irreversible forces and the secondary or reversible forces. In oleaginous systems of solid glycerides in liquid glycerides, the primary, irreversible, forces arise from local intergrowths between crystals which are inter-congealed to continuity. Once formed, these primary bonds can be broken only by drastic treatment such as by violent agitation. The secondary, reversible forces arise from the Van der Waals-London attractions between small particles. The secondary bonds are much weaker than the primary bonds; but, after having been broken, the secondary bonds are restored upon removal of the action or force which temporarily destroyed them. The Van der Waals-London attractive forces represent the most commonly occurring type of reversible interaction between the dispersed particles. The difference between these two types of forces in shortenings, reversible and irreversible, have been further described in an article by A. J. Haighton, Fette, Seifen, Anstrichmittel, vol. 65, No. 6, pp. 479–482 (1963) and in an article by Van den Tempel, J. Coll. Science, vol. 16, pp. 284–96 (1961). A more detailed explanation of Van der Waals-London forces can be found in a text by K. J. Mysels, Introduction to Colloid Chemistry, Interscience Publ., p. 83 (1959).

The oleaginous gel compositions of this invention are defined herein in terms of the above Van der Waals-London forces between the dipersed particles of solid triglyceride in liquid glyceride as follows: for a fixed amount of solid phase in a fixed amount of liquid phase, provided the right concentration of solid phase is used, the dispersion of solids can be made to contain very many small particles which are in the size range where Van der Waals-London forces prevail. These forces then can cause the particles to join into filamentous chains which then can mesh into a continuous three-dimensional network strong enough to impart high consistency or even elasticity and yield value to the system. Stirring or shaking would break down the network, causing the consistency to break down somewhat, but after a period of rest the particles would reform into chains and network again. Such a product ranges in viscosity from that of a thickened pourable oil to that of a readily pumpable solid. The individual crystals range in particle size from less than 1 to about 10 microns and are agglomerated to clusters or aggregates ranging in size from a few microns to about 30 microns. These crystals and clusters of crystals are dispersed in the liquid glyceride.

The oleaginous gel compositions of this invention also are distinguished from conventional pourable oleaginous suspensions, on the one hand, and from conventional plastic shortenings, on the other hand, in terms of Van der Waals-London forces which prevail over the crystal size range of this invention. It is known that Van der Waals-London forces decrease rapidly with an increase in interparticle distance. These forces are of importance only between very small particles which are in close proximity to each other. If the particle size of the triglyceride solids in the oleaginous gels were increased while holding the solids content at a fixed level, the particle size would reach the point where Van der Waals-London forces would no longer prevail since the particles in a given space would be too large and too few. The particles would still be small enough to remain dispersed indefinitely due to minute convection currents overcoming the gravitational pull. But these systems would not exhibit the yield value and high consistency of the oleaginous gels; they would be pourable oleaginous suspensions. Examples of such pourable oleaginous suspensions are taught by Holman and Sanders, U.S. Patent 2,815,285, and Andre and Going, U.S. Patent 2,815,286, both granted Dec. 3, 1957; Thompson, U.S. Patent 2.875,065, granted Feb. 24, 1959; Payne and Seybert, U.S. Patent 2,999,022, granted Sept. 5, 1961; and Handschumaker, U. S. Patent 2,999,755, grandted Sept. 12, 1961.

If the particle size were increased still further, there would then be formed a rigid three-dimensional crystal network through intercongealing to continuity of the individual crystals. Each individual bond would possess great strength and if the solids concentration were high enough the dispersion would have the firm consistency of a conventional plastic shortening. Examples of such plastic shortenings having a beta crystalline phase are described by Lutton, U.S. Patent 2,801,177, granted July 30, 1957 and Thompson, U.S. Patent 3,102,814, granted Sept. 3, 1963.

Hybrids of the above three systems can exist. For example, a rigid matrix of large crystals which entraps oil or liquid glyceride in the cells formed by its network can include in these cells particles in the size range in which Van der Waals-London forces prevail, or particles which form pourable oleaginous suspensions.

Initially, in order to prepare the oleaginous gel compositions of this invention, it is necessary to carefully control both the concentration of the solid triglyceride in liquid glyceride and the particle size of these triglyceride solids. The right solids to liquid ratio can be apportioned by measurement. It has been found that crystal particle size is affected, in part, by the rate of crystallization during freezing of a molten mixture of solid triglyceride in liquid glyceride. Agglomeration of crystals in an agglomerator or "picker box" can then be used as a further crystal size control. But where oleaginous systems of small crystals are involved it has been found that these crystals must have a sufficiently high melting point to prevent their digestion and reprecipitation as large crystals upon aging (storage) of the product which would destroy the desired gel properties. To accomplish this stability of particle size against time over the normal range of room temperature (70° F. to 90° F.) it is necessary that these solid triglycerides be at least 70% in a stable beta crystalline phase. Preferably, they are at least 90% in a stable beta crystalline phase.

It is generally known that triglyceride solids tend to exist in one of several different crystalline phases. These crystalline phases have been denoted alpha, beta-prime, and beta. The particular crystalline phase of a solid fat can be readily determined by X-ray diffraction patterns. The beta crystalline phase is more thermodynamically stable than the alpha or beta-prime phases. A further description of the nomenclature and determination of these polymorphic crystalline phases is set forth in Holman and Quimby, U.S. Patent 2,521,219 and Mitchell, U.S. Patents 2,521,242–3, granted Sept. 5, 1950, and in an article written by E. S. Lutton, J. Amer. Chem. Soc., vol. 67, p. 524 (1945).

The prior art teaches the preparation of beta-phase compositions by methods which involve either the precipitation of the solid triglycerides in the alpha or beta-prime phase followed by conversion to beta-phase at temperatures of 90° F. or higher, generally about 100° F.–120° F., or the slow cooling of a melt of solid triglycerides in liquid glycerides under agitation to form beta-phase crystals directly. Examples of such processes and suitable formulations are described in the aforementioned Holman and Quimby, U.S. Patent 2,521,219; Mitchell, U.S. Patents 2,521,242–3; Holman and Sanders U.S. Patent 2,815,285; Andre and Going, U.S. Patent 2,815,286; Payne and Seybert, U.S. Patent 2,999,022; and Thompson, U.S. Patent 3,102,814; as well as in Haighton, Republic of South Africa Patent 63/3,155, filed July 15, 1963.

In contrast to the prior art relating to the preparation of beta-phase plastic oleaginous compositions and beta phase pourable oleaginous suspensions, in order to prepare the oleaginous gel compositions of this invention it is essential to rapidly crystallize triglyceride solids to beta-phase crystals in-process by rapidly chilling to less than about 85° F. (preferably between about 55° F. and 85° F.) in less than about 60 seconds (preferably less than about 45 seconds) a completely melted mixture comprising from 92% to about 99% by weight (preferably about 95% to about 99% by weight), liquid glyceride having an iodine value of about 107 or greater (preferably not exceeding about 140) and from about 1% to 8% by weight (preferably about 1% to about 5% by weight) solid triglyceride having an iodine value not exceeding about 12, said solid triglyceride consisting esentially of a blend of (a) beta-phase-tending hardstock and (b) non-beta-phase-tending hardstock having a substantially proportion of fatty acid groups having from 20 to 24 carbon atoms, the proportions of (a) and (b) in said blend ranging from about 1:4 to about 4:1, said beta-phase crystals having a particle size ranging from less than 1 to about 10 microns. The individual crystals can be agglomerated to clusters or aggregates ranging in size from a few microns to about 30 microns.

The rapid chilling can be conducted in a freezer such as a scraped wall heat exchanger. A suitable device for this purpose, referred to as a "Votator," is described by Vogt, U.S. Reissue Patent 21,406, granted Mar. 19, 1940.

The liquid glyceride component of the oleaginous gel compositions of this invention can be any normally liquid glyceride oil or partially hydrogenated glyceride oil having an iodine value of about 107 or greater. Suitable glycerides can be obtained from animal, vegetable or marine sources, including naturally-occurring triglyceride oils and fats such as cottonseed oil, soybean oil, peanut oil, olive oil, palm oil, coconut oil, corn oil, rapeseed oil, sunflower seed oil, sardine oil, lard, tallow and the like materials containing a substantial proportion of fatty acid groups having from about 12 to about 24 carbon atoms.

Examples of beta-phase-tending hardstocks which can be used in the solid triglyceride component are tristearin, tripalmitin, and symmetrical palmitodistearin. Hard fats which have been subjected to molecular rearrangement and hydrogenation processes whereby a major amount of tristerin or tripalmitin, for example, is caused to be present in the rearranged product can also be used. Other suitable triglyceride hardstocks having strong beta-phase tendencies can be derived from substantially completely hydrogenated fats and oils such as lard, sunflower seed oil, safflower seed oil, linseed oil, seasame seed oil, hazelnut oil, soybean oil, peanut oil, olive oil, corn oil, and other fats and oils having a substantial proportion of fatty acid groups having at least 8 carbon atoms in the molecule. The preferred beta-phase-tending hardstock is substantially completely hydrogenated soybean oil having an iodine value of about 8.

The preferred non-beta-phase-tending hardstock component of the triglyceride solids blend is substantially completely hydrogenated rapeseed oil having an iodine value of about 8. This material tends to crystallize in the beta-prime phase and is known to hinder the formation of beta-phase crystals in conventional shortenings. Unexpectedly, it has been found that substantially completely hydrogenated rapeseed oil in combination with beta-phase-tending hardstock in the aforesaid proportions can be processed to form a desirable oleaginous gel composition as herein defined. In spite of the fact that rapeseed hardstock is a non-beta-phase-tending hardstock, the above defined combinations of rapeseed hardstock and beta-phase-tending hardstock, when processed as defined herein, crystalline at least 70% in the beta-phase, even when the hardstock combination contains as much as about 80% by weight rapeseed hardstock. In most instances, the combinations will crystallize at least 90% in the beta-phase. Other non-beta-phase-tending hardstocks which can be used in the practice of this invention are substantially completely hydrogenated fats and oils having a substantial proportion of fatty acid groups having 20 to 24 carbon atoms such as mustard seed oil, crambe oil and fish oils such as salmon, herring, pilchard, whale, menhaden and sardine oil.

Certain variations in the oleaginous gel compositions of this invention are particularly useful for the preparation of a flavor improved peanut butter with soft, spreadable consistency, as described in co-pending application Ser. No. 408,243, filed Nov. 2, 1964. For such use, the initial completely melted glyceride composition will contain, additionally, a suitable amount of peanut paste as described therein.

Other variations of the oleaginous gel compositions of this invention are particularly useful for the preparation of margarines with desirable spreadability at all use temperatures, as described in co-pending application Ser. No. 544,694, filed concurrently herewith. In such use, the oleaginous gels contain aqueous liquid, milk solids, flavorings, etc. as described therein.

Further, other variations of the oleaginous gels of this invention can be mixed with an aqueous acidic solution to form emulsions for the preparation of salad dressings. These products are described in co-pending application Ser. No. 544,696, filed concurrently herewith.

All of the oleaginous gels disclosed herein have utility as bases for the suspension of solid, high protein materials. These compositions are useful as sandwich spreads, snacks and related products. Usable protein materials are those edible solids which contain a minimum of about 10% by weight protein. To be suspendible in the oleaginous gels of this invention, the protein material must have a maximum particle size of about 500 microns. The protein material can comprise up to about 90% by weight of the total composition, and preferably comprises up to about 75% by weight. Most preferably, the protein material comprises up to about 55% of the total composition. Typical examples of gel-suspendible solid, high protein materials for use in combination with the oleaginous gels are: dried milk solids, cottonseed meal, soybean meal, dried fish protein concentrate, dried yeast, gluten, dried cheese, whey solids, lactalbumin, casein, dried or cured meal, dried poultry, dried eggs, corn meal, rye flour, gelatin, amino acids (from synthetic or natural sources), dried beans and peas, dried alfalfa, rice, wheat germ, or mixtures thereof. Minor ingredients can be added to improve the flavor or appearance of these compositions. The use of the oleaginous gels of this invention in combination with high protein materials is shown more particularly in Example 8, below.

The oleaginous gel compositions also have been found to be particularly useful as carriers for the suspension of non-aqueous ingredients such as sugars (e.g., sucrose and dextrose), salt, cocoa, pulverized hard fats, emulsifiers, and other gel-suspendible agents and mixtures thereof in amounts up to about 75% by weight of the total composition. It is useful as a carrier of ingredients for sauces, toppings and frostings ranging in consistency from that of a thickened oil to a soft and spreadable plasticity. It can also be used as a shortening for the manufacture of pastry, bread and other bulk shortening products.

The oleaginous gel compositions of this invention can also contain conventional emulsifiers such as the mono- and diglycerides of higher fatty acids and partial fatty acid esters of other polyols such as glycol, sorbitol, sorbitan, and polyoxyethylene sorbitan. It can also contain partial fatty acid ester derivatives of carboxylic acids such as lactic, citric, and tartaric acids. Specific examples of these emulsifiers are mono- and distearin, mono- and diolein, propylene glycol monostearate, sorbitol monopalmitate, sorbitan and polyoxyethylene sorbitan mono- and distearates, lactostearin, lactobehenin, stearyl monoglyceridyl citrate and diacetyl tartaric acid ester of lauryl alcohol. Antioxidants such as butylated hydroxytoluene, butylated hydroxyanisole, citric acid and methyl silicone can also be employed for their conventional antioxidant properties.

Any of the above-described additives conveniently can be incorporated in the oleaginous gels by including them in the mixture of oleaginous ingredients prior to the rapid chilling step.

The following examples will serve to illustrate the invention with greater particularity. Unless indicated to the contrary, all ratios and percentages are by weight.

Example 1

A composition of solid triglyceride fat in liquid fatty acid ester was prepared by mixing together the following components.

| Components: | Parts by weight |
|---|---|
| Partially hydrogenated soybean oil (iodine value 107) | 95.6 |
| Substantially completely hydrogenated soybean oil (iodine value 8) | 2.64 |
| Substantially completely hydrogenated rapeseed oil (iodine value 8) | 1.76 |

(a) 118 pounds of the above mixture were melted and heated to about 150° F. under agitation in a mixing tank and then rapidly chilled in a freezer (scraped wall heat exchanger) to 80° F. in about 16 seconds to crystallize the triglyceride solids in beta-phase. Following the transformation to beta-phase the mixture was passed into an agglomerator (picker box) under gentle agitation for 2 minutes. The mixture was then filled into 12 oz. jars and stored at 80° F. for 24 hours in a quiescent state. The final product temperature was returned to 70° F. and penetrated with a Precision Scientific A.S.T.M. Penetrometer equipped with a standard D 217 grease cone, and the apparent viscosity was determined with a Brookfield Viscometer, Model RVT–½ on a heliopath stand.

The penetration is recorded in the number of tenths of a millimeter the cone penetrates the sample in 5 seconds. The viscosity is recorded in Brookfield centipoises. The oleaginous gel compositions of this invention preferably range in penetration from about 200 to about 400 mm./10 and preferably range in viscosity from about 2500 to about 800,000 centipoises.

| | Freezer outlet temperature, ° F | Storage temperature, ° F. | Penetration, mm./10 | Viscosity, centrpoises (in thousands) |
|---|---|---|---|---|
| (a) | 55 | 80 | * | 44-36 |
| | | 90 | 338 | * |
| | | 100 | 340 | * |
| (b) | 60 | 80 | 340 | 45-37 |
| | | 90 | 337 | * |
| | | 100 | 348 | * |
| (c) | 65 | 80 | 325 | 68-52 |
| | | 90 | 325 | * |
| | | 100 | 345 | * |
| (d) | 70 | 80 | 307 | 89-60 |
| | | 90 | 311 | * |
| | | 100 | 341 | * |
| (e) | 75 | 80 | 297 | 52-30 |
| | | 90 | 303 | * |
| | | 100 | 331 | * |
| (f) | 80 | 80 | 320 | 40-31 |
| | | 90 | 312 | * |
| | | 100 | 345 | * |
| (g) | 85 | 80 | 338 | 37-26 |
| | | 90 | 336 | * |
| | | 100 | 346 | * |
| (h) | 90 | 80 | 337 | 24-15 |
| | | 90 | 321 | * |
| | | 100 | 325 | * |

*Not determined.

The first and second listed viscosity readings for each sample were taken, respectively, after the first and sixth revolutions of the spindle of the Brookfield Viscometer. X-ray diffraction patterns were obtained and the triglyceride solids of all samples were determined to be from 95% to 100% in beta crystalline form. Microscopic examination of the samples showed the crystal size (smallest dimension) of samples (a) through (f) to be about 1/10 to 1 micron; sample (g) about 1/2 to 1 1/2 microns; and sample (h) about 1 to 2 microns.

The size of the individual crystals in the samples did not change much as the freezer outlet temperature was raised from 55° F. to about 80° F. At about 85° F. there was a pronounced change in crystal aggregate size, that is, the individual crystals began to form larger clusters. Also, the surface of the samples which was glossy at freezer outlet temperatures below about 85° F. became increasingly dull at temperatures above this level. The products having freezer outlet temperatures below 85° F. were reversible semi-rigid gels and were temporarily pourable after they had been slightly worked with a spoon. At about 85° F. to 90° F. the products were rigid initially and required more agitation in order to become pourable. After such agitation, the latter products remained permanently pourable.

Example 2

A composition of solid triglyceride fat in liquid fatty acid ester was prepared by mixing together the following components.

| Component: | Parts by weight |
|---|---|
| Refined, bleached and deodorized peanut oil | 91.7 |
| Partially hydrogenated soybean oil (iodine value 107) | 5.9 |
| Substantially completely hydrogenated soybean oil (iodine value 8) | 1.44 |
| Substantially completely hydrogenated rapeseed oil (iodine value 8) | .96 |

(a) 109 pounds of the above mixture was melted and heated to about 155° F. and then allowed to cool to about 142° F. The mixture was then rapidly chilled in a freezer (scraped wall heat exchanger) to 80° F. in about 16 seconds to crystallize the triglyceride solids in beta-phase. Following transformation to beta-phase the mixture was passed into an agglomerator (picker box) under gentle agitation for 2 minutes. The mixture was then filled into 12 oz. jars and stored at 80° F. for 24 hours in a quiescent state. The final product was returned to 70° F. and penetrated with a Precision Scientific A.S.T.M. Penetrometer, and the apparent viscosity was determined with a Brookfield Viscometer, as in Example 1.

The above procedure was repeated several times except that the freezer outlet temperatures and storage temperatures were varied as follows:

| | Freezer outlet temperature, ° F. | Storage temperature, ° F. | Penetration, mm./10 | Viscosity, centipoises |
|---|---|---|---|---|
| (a) | 55 | 80 | 345 | 22,800 |
| | | 100 | 350 | |
| (b) | 60 | 80 | 348 | 22,000 |
| | | 100 | 356 | |
| (c) | 65 | 80 | 357 | 18,000 |
| | | 100 | 356 | |
| (d) | 70 | 80 | 334 | 24,000 |
| | | 100 | 351 | |
| (e) | 75 | 80 | 332 | 21,200 |
| | | 100 | 360 | |
| (f) | 80 | 80 | 351 | 12,000 |

The crystal size followed the same pattern as in Example 1 as the freezer outlet temperature was increased from 55° F. to 80° F. All samples were in beta phase as determined by X-ray diffraction patterns.

When cottonseed oil is substituted for peanut oil in the above example, substantially similar results are obtained in that semi-rigid oleaginous gels are produced which contain solid beta hardstock crystals with an individual particle size of up to about ten microns.

Example 3

A mixture of partially hydrogenated soybean oil (iodine value 107) and substantially completely hydrogenated soybean and rapeseed oils (iodine value 8) was melted together and rapidly chilled in a freezer to 75° F. in about 20 seconds. In order to demonstrate the in-process crystallization of triglyceride solids in beta-phase, X-ray analyses were made immediately after removing the crystallized product from the freezer, with only a 10 minute time lag elapsing in order to prepare the X-ray sample holder. The above procedure was repeated several times for additional samples having the compositions as shown in the table below. In each case, the triglyceride solids were analyzed as 100% in beta-phase. Penetrations at 70° F. and Broonfield viscosity determinations were made and are also shown in the table.

| | Composition in weight percent | | | Penetration mm./10 | Viscosity, centipoises |
|---|---|---|---|---|---|
| | Soybean oil (I.V.107) | Soybean hardstock (I.V. 8) | Rapeseed hardstock (I.V. 8) | | |
| (a) | 95 | 1.5 | 3.5 | 223 | 95,000 |
| (b) | 95 | 2.5 | 2.5 | 214 | 350,000 |
| (c) | 95 | 3.5 | 1.5 | 281 | 95,000 |
| (d) | 95 | 5 | 0 | (1) | 25,000 |

[1] Soupy liquid.

Samples (a) through (c) were reversible gels. Sample (d), containing 5% soybean hardstock but no rapeseed hardstock, is not representative of this invention and is included in the example solely for comparison purposes. It was a soupy liquid and did not have a reversible gel structure.

Example 4

The procedure of Example 1 was repeated for several compositions containing 96.6%, by weight, partially hydrogenated soybean oil (iodine value 107) and 3.4%, by weight, rapeseed and soybean hardstocks (iodine value 8) in a ratio of 2:3, respectively. The crystallized products were stored at 70° F. for two months and then tested for Brookfield viscosity in centipoises at 70° F. The products were violently agitated and then allowed to rest in a quiescent state for another 24 hours. After this 24 hour period the products were again tested for Brookfield viscosity in centipoises at 70° F. The following table records the viscosity and the particle size (both the individual crystal size and the size of the crystal clusters or aggregates) for these products at several freezer outlet temperatures ranging from 55° F. to 110° F.

| | Freezer outlet temperature, ° F. | Particle size, microns | | Viscosity, centipoises | |
|---|---|---|---|---|---|
| | | Individual crystals | Crystal aggregates | Unagitated | After agitation and 24 hours' rest |
| (a) | 55 | 1]100 to 1 | 1/10 to 5 | 32,000 | 24,000 |
| (b) | 60 | 1/100 to 1 | 1/10 to 5 | 42,000 | 24,000 |
| (c) | 65 | 1/100 to 1 | 1/10 to 10 | 47,000 | 25,000 |
| (d) | 70 | (*) | 1/10 to 10 | 58,000 | 24,000 |
| (e) | 75 | (*) | 1/10 to 30 | 36,000 | 14,000 |
| (f) | 80 | (*) | 1/10 to 30 | 32,000 | 12,000 |
| (g) | 85 | 1/5 to 5 | 1/10 to 50 | 65,000 | 10,000 |
| (h) | 100 | 5 to greater than 10. | ≧50 | 66,000 | 7,000 |
| (i) | 110 | 5 to greater than 10. | ≧50 | 86,000 | 4,000 |

*Not determined.

The above example illustrates the reversible Van der Waals-London binding forces which operate on the gel composition of this invention. At freezer outlet temperatures of less than about 85° F. the crystal aggregates range up to about 30 microns in size and the gel products are essentially reversible in structure. At freezer outlet temperatures of 85° F. and higher the particles increase in both their individual size and the size of aggregates with a concurrent loss in reversible gel structure as noted by the substantially increased disparity between the initial viscosity before agitation and the viscosity after agitation followed by 24 hours at rest.

Additional samples of products (a), (b) and (e) were each separately stored for six months at 70° F. and 90° F., after which time viscosity determinations at 70° F. were made. All samples showed essentially the same viscosity as shown before the six month storage period.

Example 5

The procedure of Example 1 was essentially repeated (with variations as shown below) for several compositions containing partially hydrogenated soybean oil (iodine value 107) and a blend of rapeseed and soybean hardstocks (iodine value 8; weight ratio of rapeseed/soybean=⅔). The components were completley melted and then rapidly chilled in about 24 seconds in a scraped wall heat exchanger to freezer outlet temperatures shown below. The products were stored in 50 pound cans at 70° F. for two days and the viscosity was determined with a Brookfield Viscometer as in Example 1.

| Composition in weight percent | | Freezer outlet temperature, ° F. | Viscosity, centipoises |
|---|---|---|---|
| Soybean oil (I.V. 107) | Total hardstock (I.V. 8) | | |
| 99.5 | 0.5 | 40 | 200 |
| 99.5 | 0.5 | 45 | 200 |
| 99.5 | 0.5 | 50 | 200 |
| 99.5 | 0.5 | 55 | 200 |
| 99 | 1.0 | 40 | 7,000 |
| 99 | 1.0 | 45 | 7,000 |
| 99 | 1.0 | 50 | 7,000 |
| 99 | 1.0 | 55 | 8,000 |
| 98 | 2.0 | 40 | 14,000 |
| 98 | 2.0 | 45 | 14,000 |
| 98 | 2.0 | 50 | 14,000 |
| 98 | 2.0 | 55 | 14,000 |

The above example illustrates the importance of at least about 1% total hardstock in the composition. Although at the ½% hardstock level the particle size may be small enough for Van der Waals-London forces to occur, there is an insufficient proportion of solid triglyceride particles to form the necessary three dimensional network for the gel composition of this invention as seen by the exceedingly low viscosity of 200 centipoises.

The oleaginous gel compositions of this invention illustrated in the above examples are useful as bulk shortenings for pastry and bread making. Similarly useful oleaginous gels are obtained when tripalmitin and tristearin are substituted for substantially completely hydrogenated soybean oil and when substantially completely hydrogenated mustard seed oil is substituted for substantially completely hydrogenated rapeseed oil in the above examples. The following examples illustrate useful admixtures of the oleaginous gel composition of this invention with various suspendible solids.

Example 6

One hundred and ninety pounds of an oleaginous composition were prepared by mixing the ingredients in a stainless steel tank and heating them to 150° F. to melt the solid triglycerides. The composition was composed of 92% by weight refined and bleached soybean oil (iodine value 107) and 8% by weight of a blend of equal weight of soybean and rapeseed hardstocks (iodine value 8). The mixture was then rapidly chilled in a scraped wall heat exchanger to 50° F. within 20 seconds to crystallize the triglyceride solids in excess of 95% in the beta phase. The mixture was passed into an agglomerator (picker box) for two minutes under gentle agitation, and then placed in one pound cans. After storage at 70° F. for 24 hours, one sample of the composition was used in the penetration and viscosity test described in Example 1. The penetration was 234 mm./10 and the viscosity was 800,000 centipoises.

A second sample of the composition, which was firm and non-pourable, was agitated with a spoon for about ten seconds. The sample became readily pourable. Agitation was discontinued and the sample was returned to rest for 24 hours at 70° F., after which it was reexamined. The composition had returned to its former firm and non-pourable consistency, indicating that the composition was a reversible semi-rigid gel.

The composition of this example was useful as a carrier for the suspension of non-aqueous ingredients such as sugars, salt, cocoa, pulverized hard fats and emulsifiers, and for the suspension of solid high protein materials such as dried milk solids, soybean meal, dried cheese, dried eggs, amino acids and wheat germ.

Example 7

A stock oleaginous gel composition was prepared as in Example 1 using 95%, by weight, partially hydrogenated soybean oil (iodine value 107) and 5% by weight, of a mixture of equal parts of soybean and rapeseed hardstocks (iodine value 8). The completely melted mixture was chilled to 57° F. in less than about 45 seconds. The viscosity of this product was about 350,000 centipoises (Brookfield); the individual crystal size was less than 10 microns; and the solids were in 100% beta-phase.

(a) The stock gel (one pound) was mixed with micro-pulverized cocoa (one pound) in a Hobart Model C–100 mixer at medium speed. The resulting product had a soft, creamy, spreadable gel consistency and is a desirable base for icings, toppings, cake frostings, chocolate sauces, and the like.

(b) The stock gel (one pound) was similarly mixed with micro-pulverized soybean hardstock (½ pound). The resulting product has a creamy white, soft gel consistency and is useful as a baking shortening.

Another stock gel composition was prepared as above in which the weight percent of the total hardstock in the composition was 2.5%, and used as follows:

(c) The stock gel (one pound) was mixed as above with micro-pulverized soybean hardstock (½ pound) to form a creamy white, soft gel product which is useful as a baking shortening.

(d) The stock gel (one pound) was mixed as above with micro-pulverized salt (sodium chloride—one pound) to form a gel product which can be used as a peanut butter stabilizer.

(e) The stock gel (one pound) was separately mixed as above with (1) micro-pulverized dextrose (one pound) and
(2) micro-pulverized sucrose (one pound).

Both of these sugar-gel suspensions are suitable as icing and topping bases.

(f) The stock gel (one pound) was mixed as above with a superglycerinated hard fat containing 40% monoglycerides of soybean oil (one pound) to form a gel product which is useful as an emulsifier concentrate for baking of farinaceous products.

Example 8

A series of protein rich compositions were prepared by mixing liquid glyceride oil, solid triglyceride, protein rich material and minor ingredients in a Hobart C–100 mixer at #1 speed, and heating the mixture to about 140° F. to melt the solid triglyceride. The mixture was then rapidly chilled in a scraped wall heat exchanger to a temperature of less than 85° F. in less than 60 seconds. In each case the individual crystal size of the solid triglyceride particles was less than about 10 microns. X-ray diffraction indicated that the crystals were more than 70% in the beta-phase. The various compositions are listed below.

In the table "peanut oil" refers to refined and bleached peanut oil which has been hydrogenated to iodine value 107; "soybean oil" refers to refined and bleached soybean oil hydrogenated to iodine value 107; "soybean hardstock" refers to refined and bleached soybean oil which has been hardened by hydrogenation to iodine value 8; and "rapeseed hardstock" refers to refined and bleached rapeseed oil which has been hardened by hydrogenation to iodine value 8. The protein materials described are well known products available from a number of commercial sources.

COMPOSITION (PERCENT BY WEIGHT)

| | A | B | C | D | E | F | G | H |
|---|---|---|---|---|---|---|---|---|
| Peanut oil | 44.13 | | | | | | | |
| Soybean oil | 3.08 | 47.0 | 47.0 | 60.54 | 46.8 | 47.0 | 47.0 | 32.50 |
| Soybean hardstock | 0.95 | 0.9 | 0.9 | 1.15 | 0.9 | 0.9 | 0.9 | 0.25 |
| Rapeseed hardstock | 0.63 | 0.6 | 0.6 | 0.78 | 0.6 | 0.6 | 0.6 | 0.07 |
| Salt | | 1.0 | 1.0 | 0.73 | 1.0 | 1.0 | 1.0 | |
| Soy protein | 44.69 | 50.5 | | 36.8 | 50.2 | | | 67.18 |
| Dried cheese | 6.52 | | | | | | | |
| Cottonseed meal | | | 50.5 | | | | | |
| Nonfat dried milk solids | | | | | | 50.5 | | |
| Dried egg whites | | | | | | | 50.5 | |
| Meat flavor | | | | | 0.5 | | | |

All of the above oleaginous gel protein compositions had acceptable flavor, consistency and appearance for use as sandwich spreads, snacks or related products.

When in the above example, Composition H, the amount of soybean oil is 12.50 percent by weight of the composition and the amount of soy protein is 87.18 percent by weight of the composition, substantially similar results are obtained in that an oleaginous gel-protein composition is obtained which is useful as a sandwich spread and in snacks.

Further when in any of compositions A through H inclusive, of the above example, any of the high-protein materials are replaced in whole or in part by any of the high-protein materials in the following list, substantially similar results are obtained in that an oleaginous gel-protein composition is obtained which is useful as a sandwich spread and in snacks: dried milk solids, cottonseed meal, soybean meal, dried fish protein concentrate, dried yeast, gluten, dried cheese, whey solids, lactalbumin, casein, dried or cured meal, dried poultry, dried eggs, corn meal, rye flour, gelatin, amino acids (from synthetic or natural sources), dried beans and peas, dried alfalfa, rice, wheat germ, or mixtures thereof.

What is claimed is:

1. The method of preparing an oleaginous gel composition having a stable crystalline phase, said crystalline phase having a solids particle size up to about 10 microns and being at least 70% in a stable beta phase, comprising rapidly crystallizing triglyceride solids in-process to at least 70% beta-phase by rapidly chilling to less than about 85° F. in less than about 60 seconds a completely melted mixture of from 92% to about 99%, by weight, of liquid glyceride oil having an iodine value greater than approximately 107 and from about 1% to 8%, by weight, of solid triglyceride having an iodine value not exceeding about 12, said solid triglyceride consisting essentially of a blend of (a) beta-phase-tending hardstock and (b) non-beta-phase-tending hardstock having a substantial proportion of fatty acid groups having 20 to 24 carbon atoms, the proportion of (a) and (b) in said solid triglyceride blends ranging from about 1:4 to about 4:1.

2. The method of claim 1 in which the mixture contains from about 95% to about 99%, by weight, liquid glyceride oil and from about 1% to about 5%, by weight, solid triglyceride.

3. The method of claim 1 in which the rapid chilling is conducted in less than about 45 seconds.

4. The method of claim 1 in which the liquid glyceride oil is peanut oil.

5. The method of claim 1 in which the liquid glyceride oil is cottonseed oil.

6. The method of claim 1 in which the beta-phase-tending hardstock is substantially completely hydrogenated soybean oil.

7. The method of claim 1 in which the non-beta-phase-tending hardstock is substantially completely hydrogenated rapeseed oil.

8. The method of claim 1 in which the composition includes at least one additional component up to about 75%, by weight of the total composition, of a gel-suspendible agent selected from the group consisting of sugars, salt, egg solids, cocoa, pulverized hard fats, emulsifiers, and mixtures thereof.

9. The method of claim 1 in which the composition includes, as an additional ingredient, at least one gel suspendible solid, high-protein material, said high-protein material comprising up to about 90% by weight of the total composition.

10. The method of claim 1 in which the liquid glyceride oil is partially hydrogenated soybean oil having an iodine value not greater than about 120.

11. The oleaginous gel prepared by the method of claim 10.

12. The composition of claim 11 including at least one additional component which comprises up to about 75%, by weight of the total composition, of a gel-suspendible agent selected from the group consisting of sugars, salt, cocoa, pulverized hard fats, emulsifiers, and mixtures thereof.

13. The composition of claim 11 which contains as an additional ingredient at least one gel-suspendible, solid high-protein material, said high-protein material comprising up to about 90% by weight of the total composition.

References Cited

UNITED STATES PATENTS 3,253,927 5/1966 Going et al. ---------- 99—118

MAURICE W. GREENSTEIN, *Primary Examiner.*